United States Patent [19]

Kobayashi

[11] Patent Number: 5,073,884

[45] Date of Patent: Dec. 17, 1991

[54] TRACKING APPARATUS HAVING MOVABLE AND STATIONARY PARTS

[75] Inventor: Yuhei Kobayashi, Kanagawa, Japan

[73] Assignee: Sony Corporation, Tokyo, Japan

[21] Appl. No.: 459,199

[22] Filed: Dec. 29, 1989

[30] Foreign Application Priority Data

Jan. 17, 1989 [JP] Japan .................................. 1-3710[U]

[51] Int. Cl.⁵ .............................................. G11B 7/00
[52] U.S. Cl. .................................. 369/44.37; 369/44.41
[58] Field of Search ............... 369/44.14, 44.37, 44.38, 369/44.41

[56] References Cited

U.S. PATENT DOCUMENTS 4,598,393 7/1986 Pierce et al. ...................... 369/44.26
4,977,552 12/1990 Gotoh ............................... 369/44.14

*Primary Examiner*—Robert L. Richardson
*Attorney, Agent, or Firm*—Lewis H. Eslinger; Jay H. Maioli

[57] ABSTRACT

A tracking control apparatus for use with an optical recording/reproducing apparatus includes a stationary optical section provided with a laser light source, a movable optical section provided with an objective lens by means of which three laser beams emanating from the laser light source are directed onto an optical disk, and a plurality of photodetectors having light receiving surfaces each divided into at least two segments adapted to receive the three reflected laser beams from the optical disk. A tracking control signal computing device taken the difference of detection outputs from the light receiving surfaces of said photodetectors to produce plural tracking error signals and divides the tracking error signals by the total light quantities received by the photodetectors for normalizing the tracking error signals to derive a tracking signal.

3 Claims, 2 Drawing Sheets

5,073,884

TRACKING APPARATUS HAVING MOVABLE AND STATIONARY PARTS

BACKGROUND OF THE INVENTION

1. Field of the Invention

This invention relates to a tracking control apparatus for a recording and/or reproducing apparatus on or from an optical disk, and may be advantageously applied inter alia to tracking control by a differential push-pull method.

2. Description of the Prior Art

As a tracking servo control method in a recording and/or reproducing apparatus on or from an optical disk, there has been proposed a tracking servo employing a differential push-pull (DPP) method.

The tracking servo employing this DPP method is an improvement over a push-pull tracking error detection method employing a single laser beam as disclosed for example in the Japanese Patent Publication No. 32735/1986. That is, according to the tracking servo based on the DPP method, the laser light emitted from a laser light source, such as a semiconductor laser diode, is separated by the grating method into three laser beams, i.e. the 0'th order beam and ± first order diffracted beams. Of these three laser beams, the 0'th order beam is irradiated on a recording track TR of an optical disk 1 as a laser spot for reproduction $SP_{PB}$, whereas the two ±first order diffraction beams are irradiated as two auxiliary laser spots $SP_{S1}$ and $SP_{S2}$ so that these two beams are offset ahead and back of the laser spot for reproduction $SP_{PB}$ in the track pitch direction with respect to the recording track TR (FIG. 1).

In this manner, the reflections from the three laser spots $SP_{PB}$, $SP_{S1}$ and $SP_{S2}$, derived from the three laser beams, are obtained. The reflection from the laser spot for reproduction $SP_{PB}$ is received by a four segment photodetector 2, while the reflections from the two auxiliary laser spots $SP_{S1}$, $SP_{S2}$ are received by two two-segment photodetectors 3, 4, respectively, each having its division line parallel to the recording track TR of the optical disk 1. On light reception outputs $S_A$, $S_B$, $S_C$, $S_D$, $S_E$, $S_F$, $S_G$ and $S_H$, produced by light receiving segments 2A, 2B, 2C and 2D making up the four-segment photodetector 2 and light receiving segments 3E, 3F, 4G and 4H of the two segment photodetectors 3, 4, respectively, an arithmetic operation is performed in accordance with the following formula (1)

$$S_{TE}=(S_A+S_D)-(S_B+S_C) \\ -k_1(S_E-S_F)+k_2(S_G-S_H)\ldots \quad (1)$$

wherein $k_1$ and $k_2$ are constants.

Meanwhile, with the above described recording and/or reproducing apparatus on or from an optical disk, there has been proposed an optical head in which an optical system exclusive of the optical disk is stationarily arranged in the main body of the apparatus and the objective lens is placed on an actuator and driven thereby to be shifted to a desired recording track on the optical disk to enable high speed accessing. This desired recording track is referred to hereinafter as the access position.

With the above described optical head, supposing that, if an optical axis 6L of an objective lens 6 is positioned with an offset from the 0'th order light $L_O$, among the three laser beams $LB_O$, $LB_{+1}$ and $LB_{-1}$ of the 0'th and ± first order diffraction lights emanating from a stationary optical unit 5, the coupling efficiency of the ±first order refraction lights $LB_{+1}$ and $LB_{-1}$ with respect to the object lens 6 fluctuates as a function of changes in the access positions $P_{n0}$, $P_{n1}$ of the objective lens 6. The result is that a deviation is brought about in the equilibrium of the sum signal PP2 of second and third push-pull outputs PP21, PP22, which is produced from the two-segment photodetectors 3, 4 and which is represented by the formula $$PP2=(S_E-S_F)+(S_G-S_H)\ldots \quad (2)$$

with respect to the first push-pull output PP1 which is produced by the four-segment photodetector 2 and which is represented by the formula $$PP2=(S_A-S_D)+(S_B-S_C)\ldots \quad (3)$$

Thus an inconvenience is caused that the offset produced when the objective lens 6 is off-center with respect to the recording track TR cannot be cancelled.

In addition, since the coupling equilibrium of the ±first order diffracted light beams $LB_{+1}$, $LB^{+1}$ with respect to the objective lens 6 is changed as a function of the access positions of the objective lens 6, an offset is produced in the second and third push-pull outputs PP21 and PP22 from the two two-segment photodetectors 3, 4, so as to be superimposed on the detected tracking error signal $S_{TE}$.

BRIEF SUMMARY OF THE INVENTION

It is an object of the present invention to provide a tracking control apparatus which is free from inconveniences inherent in the tracking control method employing the above mentioned conventional DPP method.

It is another object of the present invention to provide a tracking control apparatus capable of performing stable tracking control of an optical head with which high-speed accessing is feasible in accordance with the DPP method.

It is a further object of the present invention to provide a recording and/or reproducing apparatus on or from an optical disk capable of performing stable tracking control of an optical disk in which only the objective lens is movable to effect high speed accessing.

The present invention provides a tracking control apparatus in which the 0'th order light and ± first order diffracted light beams emitted by a stationary optical section inclusive of a laser light source are irradiated on the optical disk by way of a movable optical section inclusive of an objective lens and reflected light beams of the 0'th order light and the ± first order diffracted light beams are received to effect tracking control in accordance with the differential push-pull method. There is provided a tracking control signal computing circuit for dividing the differential push-pull detection outputs of the 0'th order light beam and the ± first order diffracted light beams by the total light quantities of the 0'th order light beam and the ± first order reflected light beams to effect normalization and thereby deriving the tracking control signal.

Thus it is possible with the tracking control apparatus according to the present invention to effect stable detection of the tracking control signal by dividing the differential push-pull detection outputs of the 0'th order light and the ± first order diffracted light beams by the total light quantities of the O'th order light beam and the ± first order diffracted light beams.

Other and further objects, features and advantages of the present invention will appear more fully from the following description.

DETAILED DESCRIPTION OF PREFERRED EMBODIMENTS

Figure 1:
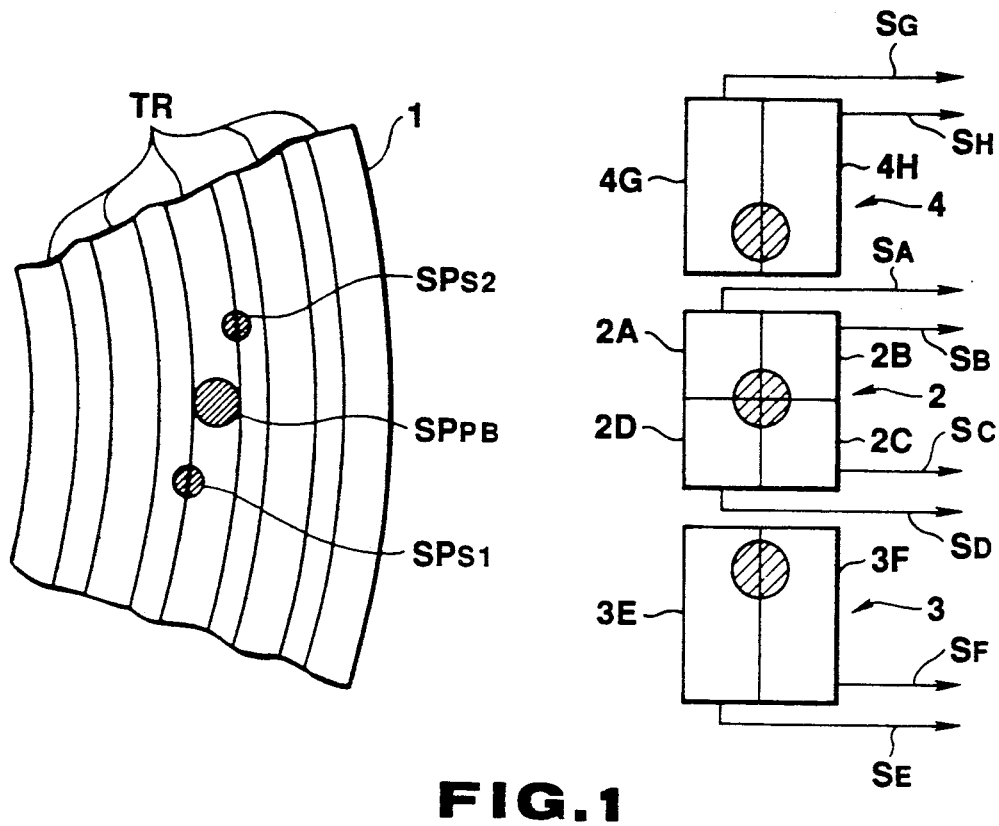
FIG. 1 is a schematic diagram for illustrating the tracking control by the differential push-pull method.

By referring to the drawings, certain preferred embodiments of the present invention will be explained in detail.

In the following description, the same numerals are used to depict the parts or components which are the same as those used in FIGS. 1 and 2 in the illustration of the tracking control method employing the aforementioned DPP method.

Figure 3:
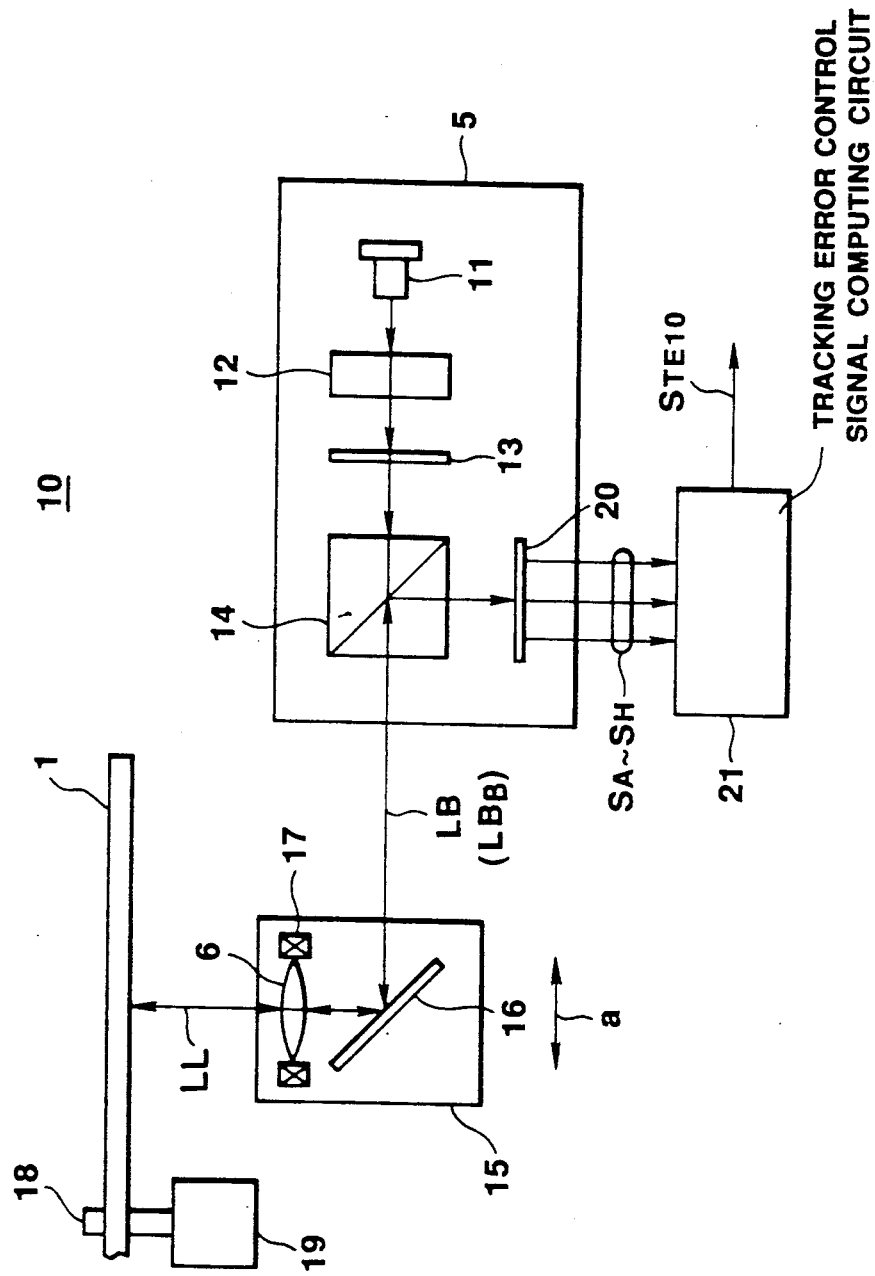
FIG. 3 is a diagrammatic view showing the recording and/or reproducing apparatus on or from an optical disk to which the tracking control apparatus according to the present invention can be applied.

Referring to FIG. 3, the recording and/or reproducing apparatus according to the present invention includes an optical head device 10 formed by a stationary optical section 5 and a movable optical section 15. The stationary optical section 5 of the optical head device 5 is made up of a laser light source 11, a collimator lens 12 for separating the laser light $L_1$ emitted by the laser light source 11 into three laser beams, that is a O'th order light beam and ± first order diffracted light beams, a grating 13, a deflected light beam splitter 14 and a photodetector 20 for receiving and detecting a return light beam $LB_B$ from the optical disk 1. The movable optical section 15, placed on an optical head actuator, not shown, is moved in a controlled manner in a direction shown by an arrow a in FIG. 3, that is, in a direction normal to the recording track TR of the optical disk 1, and is provided with an objective lens 6 and a biaxial actuator 17 for displacing the objective lens 6 in two mutually perpendicular directions, i.e. in the focusing direction parallel to an optical axis of the objective lens 6 and the tracking direction included in a horizontal plane normal to the optical axis of the objective lens 6.

By thus separating the optical head device into the stationary optical section 5 and the movable optical section 15, the weight of the movable section of the optical head device may be reduced. Thus it becomes possible with this separate type optical head device 10 to shorten the time involved in accessing a recording track on the optical disk as compared with the optical head device for the conventional recording and/or reproducing apparatus with a built-in optical system extending from the laser light source to the objective lens.

With the above described optical head device 10, the laser light LB emitted from the laser light source 11 is separated by the collimator lens 12 and the grating 13 into three laser beams LB consisting of the O'th order light beam LB and the ± first order diffracted light beams $LB_{+1}$ and $LB_{-1}$, respectively (see FIG. 2), before being transmitted through the deflected light beam splitter 14 so as to be incident on the movable optical part 15.

The laser beam LB incident on this movable optical section 15 is bent 90° at a mirror 16 and converged by the objective lens 6 supported on the biaxial actuator 17 so as to project three light spots $SP_{PB}$, $SP_{S1}$ and $SP_{S2}$ (FIG. 1) on the recording track TR of the optical disk 1.

The optical disk 1 is supported rotatably about a spindle shaft 18 as the center of rotation, by chucking means, not shown, and is driven by a spindle motor 19 so as to rotate at a predetermined speed. The reflected light from the three light spots $SP_{PB}$, $SP_{S1}$ and $SP_{S2}$, thus converged on the recording track TR of the optical disk 1, is bent 90° at the mirror 16 via the objective lens 6 so as to be incident as the return light beam $LB_B$ from the movable optical section 15 into the stationary optical section 5.

The return light beam $LB_B$ incident on the stationary optical part 5 is bent 90° by the deflected beam splitter 14 before being received by the photodetector 20 (FIG. 3) consisting of a four-segment photodetector 2 (FIG. 1) and two-segment photodetectors 3, 4 having a division line parallel to the recording track TR of the optical disk 1.

Light reception outputs $S_A$, $S_B$, $S_C$, $S_D$, $S_E$, $S_F$, $S_G$, $S_H$, produced from light receiving elements 2A, 2B, 2C, 2D of the four-segment photodetector 2 and light receiving elements 3E, 3F, 4G and 4H, are supplied as inputs to a tracking control signal computing circuit 21, where an arithmetic operation is performed in accordance with the following equation (4);

$$S_{TE10} = \frac{(S_A + S_D) - (S_B + S_C)}{S_A + S_D + S_B + S_C} - \left\{ \frac{1}{2} \frac{S_E - S_F}{S_E + S_F} + \frac{S_G - S_H}{S_G + S_H} \right\} \quad (4)$$

Figure 2:
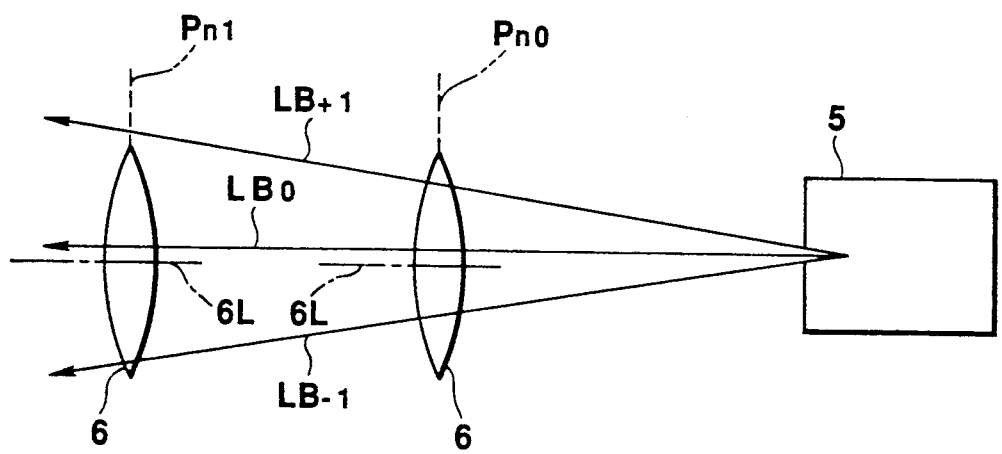
FIG. 2 is a schematic diagram showing the relation between the laser light source and the objective lens.

Of course, if segments 2A and 2D in FIG. 1 are merged into a single segment 2A, and segments 2B and 2C in FIG. 1 are merged into a single segment 2B, then equation (4) reduces to the following equation (4a):

$$S_{TE} = \frac{S_A - S_B}{S_A + S_B} - \frac{1}{2}\left( \frac{S_E - S_F}{S_E + S_F} + \frac{S_G - S_H}{S_G + S_H} \right)$$

The arithmetic operation based on this equation (4) consists in computing the tracking control signal $S_{TE10}$ using the light reception outputs $S_A$ to $S_H$.

That is, with the present tracking control signal computing circuit 21, in consideration that the first push-pull output PP1 obtained from the aforementioned four-segment photodetector 2 on the basis of the formula (3) and the second and third push-pull outputs PP21 and PP22 obtained from the two-segment photodetectors 3, 4 on the basis of the formula (2) are approximately proportionate to the total light quantities $TC_2$, $TL_3$ and $TL_4$ of the photodetectors 2, 3 and 4 represented by the formulas $$TL_2 = S_A + S_D + S_B + S_C \ldots \quad (5)$$

$$TL_3 = S_E + S_F \ldots \quad (6)$$

$$TL_4 = S_G + S_H \ldots \quad (7)$$

the push-pull outputs PP1, PP21, PP22 obtained from the photodetectors 2 to 4 are divided by the total light quantities TL$_2$, TL$_3$ and TL$_4$, respectively, for normalization.

In this manner, even supposing that the 0'th order light LB$_O$ and the optical axis LL of the objective lens 6 are arranged with an offset from each other, the tracking control signal computing circuit 21 functions to eliminate this offset to enable detection of stable tracking control signal S$_{TE10}$ at all times.

With the above described arrangement, the differential push-pull detection outputs PP1, PP21 and PP22 of the 0'th order light beam and ±first order diffracted light beam are divided by the total light quantities TL$_2$, TL$_3$ and TL$_4$, respectively, for normalization, to produce stable tracking control signals S$_{TE10}$, whereby a tracking control device may be realized which is able to perform stable tracking control of the optical head which is adapted to move only the objective lens 6 to effect a higher speed accessing.

With the above illustrative embodiment, the tracking error control signal computing circuit 21 itself functions as the automatic gain control (AGC) circuit, so that, even if there should be laser power fluctuations, as in the case of the overwritable recording and/or reproducing apparatus, there is no necessity for providing an AGC circuit and hence the overall construction may be simplified despite the provision of a division circuit as the tracking control signal computing circuit 21.

Although the present invention is applied in the above embodiment to the tracking control device for the recording and/or reproducing apparatus on or from an optical disk, the present invention may also be applied extensively to other optical recording and/or reproducing apparatus such as a recording and/or reproducing apparatus on or from a magneto-optical disk.

According to the present invention, as explained hereinabove, the differential push-pull detection outputs of the 0'th order light beam and ± first order diffracted light beams, obtained in accordance with the differential push-pull method, are divided by the total light quantities of the reflected light beams derived from the 0'th order light beam and the ± first order diffracted light beams, respectively, for normalization, so that a tracking control apparatus may be realized which enables detection of stable tracking control signals at all times.

In this manner, a recording and/or reproducing apparatus may be realized which enables stable tracking control of the optical head which may be accessed at a higher speed to move only the objective lens.

What is claimed is:

1. A tracking control apparatus for use with an optical recording and/or reproducing apparatus comprising:
   a stationary optical section;
   a laser light source mounted on said stationary optical section for producing three laser beams;
   a movable optical section;
   an objective lens mounted on said movable optical section by means of which the three laser beams irradiate an optical disk for reflection therefrom as three reflected laser beams;
   a plurality of photodetectors each having a light receiving surface divided into at least two segments adapted to receive the three reflected laser beams, said segments producing respective detection output signals; and
   tracking control signal computing means responsive to said detection output signals for producing plural tracking error signals and for normalizing said tracking error signals on the basis of the total light quantities received by said photodetectors to derive a tracking control signal.

2. The tracking control apparatus according to claim 1 wherein said tracking control signal computing means is adapted for dividing said tracking error signals by the total light quantities received by the light receiving surfaces of said photodetectors.

3. The tracking control apparatus according to claim 2 wherein, when a light spot of a first one of the three laser beams emanating from said laser light source is on a track of said optical disk, light spots of second and third ones of the three laser beams are formed at offset positions from said track on said optical disk at upstream and downstream sides of said first laser beam, and wherein the tracking control signal S$_{TE}$ is given by $$S_{TE} = \frac{(S_A - S_B)}{(S_A + S_B)} - K\left[\frac{S_E - S_F}{S_E + S_F} + \frac{S_G - S_H}{S_G - S_H}\right]$$

wherein S$_A$, S$_B$ denote detection outputs from light receiving surfaces of that one of said photodetectors which receives the reflected light of said first laser beam, S$_E$, S$_F$, S$_E$ and S$_H$ denote detection outputs from light receiving surfaces of those of the photodetectors which receive the reflected light beams of said second and third laser beams, and K denotes a coefficient.

* * * * *

UNITED STATES PATENT AND TRADEMARK OFFICE
CERTIFICATE OF CORRECTION

PATENT NO. : 5,073,884
DATED : December 17, 1991
INVENTOR(S) : Yuhei Kobayashi It is certified that error appears in the above-identified patent and that said Letters Patent is hereby corrected as shown below:

Col. 1, line 37, change "four segment" to --four-segment--
       line 46, change "two segment" to --two-segment--
Col. 2, line 17, change "PP2" to --PP1--
       line 23, change "$LB_+^1$" to --$LB_{-1}$--
Col. 3, line 66, change "LB" to --$LB_0$--
Col. 4, line 37, (equation 4), change "$\{\frac{1}{2}\}$" to -- $-\frac{1}{2}\{$ --

In the Claims:

Col. 6, line 48, change "$S_E$" second occurrence to --$S_G$--

Signed and Sealed this

Twenty-seventh Day of April, 1993

*Attest:*

MICHAEL K. KIRK

*Attesting Officer*      *Acting Commissioner of Patents and Trademarks*